US006695235B2

(12) United States Patent
Faller et al.

(10) Patent No.: US 6,695,235 B2
(45) Date of Patent: Feb. 24, 2004

(54) FOLDABLE POWER WASHER

(75) Inventors: Ginnie A. Faller, Sandwich, IL (US); Andrew J. Johnson, Kearney, NE (US); James N. Marshall, Elm Creek, NE (US)

(73) Assignee: Coleman Powermate, Inc., Kearney, NE (US)

( * ) Notice: Subject to any disclaimer, the term of this patent is extended or adjusted under 35 U.S.C. 154(b) by 173 days.

(21) Appl. No.: 10/037,693

(22) Filed: Oct. 19, 2001

(65) Prior Publication Data
US 2003/0080222 A1 May 1, 2003

(51) Int. Cl.[7] .............................. B05B 3/00; B05B 3/18
(52) U.S. Cl. ................... 239/722; 239/754; 239/737
(58) Field of Search ........................... 239/722, 754, 239/251, 525, 737, 753, 531, DIG. 6, DIG. 13; 134/169 C, 21; 15/321, 322, 401, 302; 37/244, 246, 248, 242

(56) References Cited

U.S. PATENT DOCUMENTS

| | | | | |
|---|---|---|---|---|
| 3,649,997 A | * | 3/1972 | Thorud | 16/437 |
| 5,163,275 A | * | 11/1992 | Hare et al. | 56/16.7 |
| 5,500,976 A | * | 3/1996 | Rohrbacher et al. | 15/320 |
| 5,538,402 A | * | 7/1996 | McKenney | 417/234 |
| 5,700,137 A | * | 12/1997 | Simonette | 417/364 |

* cited by examiner

Primary Examiner—Davis Hwu
(74) Attorney, Agent, or Firm—Leydig, Voit & Mayer, Ltd.

(57) ABSTRACT

A power washer that is foldable and that may be hung on a wall in the folded configuration. The power washer includes front and rear legs. The front legs and rear legs fold in toward one other and under a prime mover so as to make the power washer more compact when hung. The front legs are formed integral with a handle, and the front legs and handle rotate relative to the prime mover. This feature permits the folded power washer to be hung from the handle, and enables the power washer to be hung so that the prime mover is held in an upright position. The rear legs may be pivotally attached to the front legs, so that folding of the front legs causes a corresponding folding of the rear legs.

35 Claims, 6 Drawing Sheets

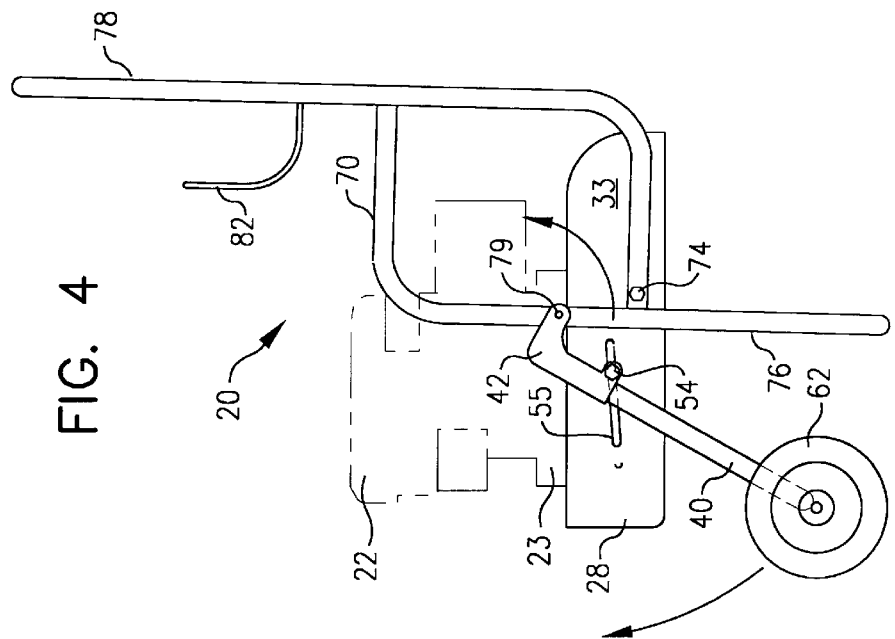
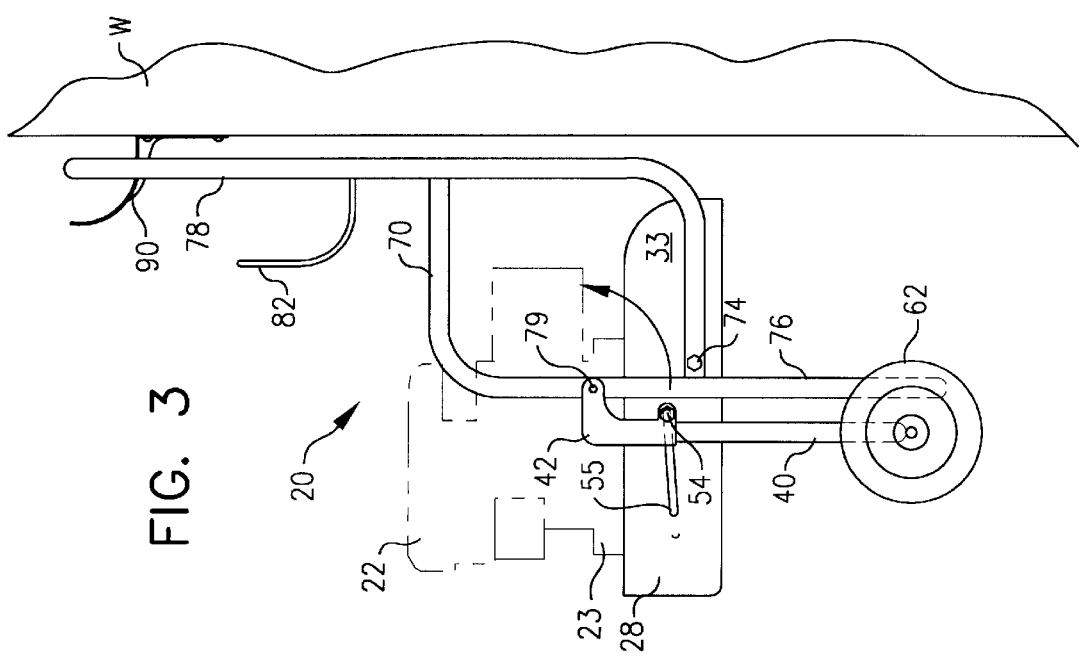

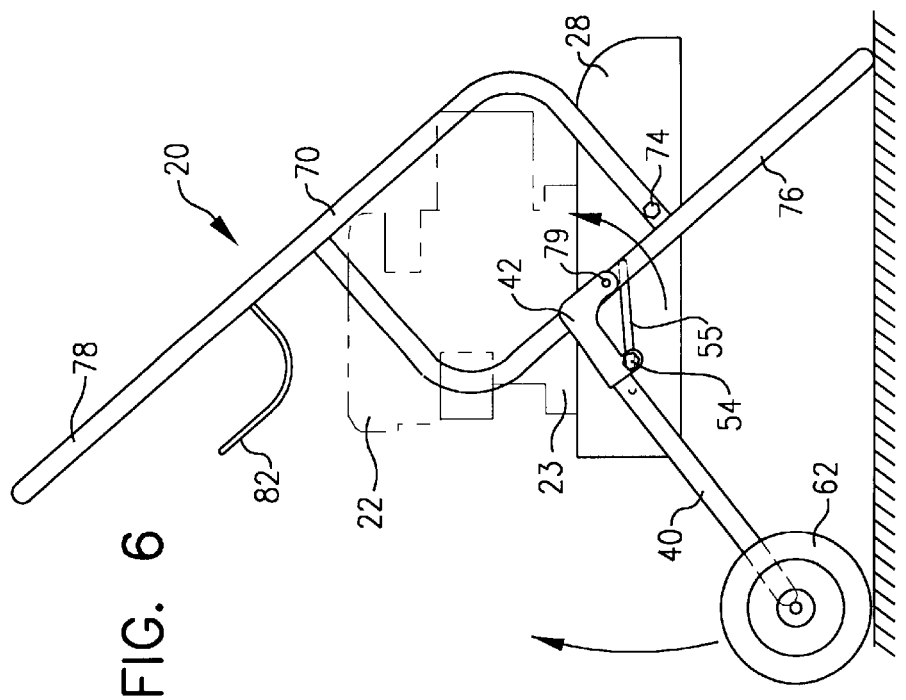

FOLDABLE POWER WASHER

FIELD OF THE INVENTION

The present invention relates generally to power tools, and more particularly to power washers.

BACKGROUND OF THE INVENTION

Power washers are becoming commonplace in home workshops and for use in residential settings. In general, a power washer, or a pressure washer, is a machine that delivers a stream of water at high pressure. The stream may be used to clean a variety of objects, such as roofs, decks, windows, cars, bricks and siding, or for sewer jetting or other applications.

Power washers are often rented, but recently more home owners are purchasing a power washer so that it is readily available for use. In addition, because the prices on the residential power washers have continued to drop, a user may purchase a power washer for the cost of only a few rentals.

A conventional residential power washer includes an inlet for a supply of water, a prime mover for generating pressure for the water, and a hose for spraying the compressed water. The prime mover may be a gas engine or an electric motor, but most conventional residential models utilize gas engines. The power washers typically include a pedestal of some kind (e.g., four feet) that allows a power washer to rest on a surface such as a floor. Alternatively, for some larger models, a pair of wheels may be provided on one end of the power washer and a handle on the other end, permitting the power washer to be wheeled around a work shop or around a yard, for example.

While conventional residential power washers work well for their intended purpose, they often add additional clutter in an already crowded work shop or garage. This problem is particularly true for larger power washers that are capable of generating higher pressures, which home owners often select because of the higher pressures they can generate, which result in better cleaning.

The size and configuration of conventional residential power washers can also make their storage difficult. For most designs, the handle and the prime mover protrude above the pedestal for the power washer. This configuration makes stacking or storing items on the power washer difficult or impossible. Placing a power washer on the floor in an already-crowded workshop has further disadvantages. For most conventional power washer designs, the prime mover, the wheels, and the handle are exposed, causing the power washer to have an industrial appearance. Although the power washer is often stored and used in a workshop environment, the various components of a power washer that are exposed on the floor of a workshop may make the workshop appear even more crowded or unkempt.

SUMMARY OF THE INVENTION

The present invention solves many problems of the prior art by providing a power washer that is foldable and that may be hung on a wall in the folded configuration. In this manner, the power washer may be conveniently and efficiently stored.

In accordance with one aspect of the present invention, the power washer includes front and rear legs. At least one of the front legs and rear legs folds in toward the other so as to make the power washer more compact when hung. In a preferred embodiment, the two sets of legs fold in toward one another and under the prime mover so that the power washer may be compactly stored.

Preferably, the front legs are formed integral with a handle, and the front legs and handle rotate relative to the prime mover. This feature permits the folded power washer to be hung from the handle, and enables the power washer to be hung so that the prime mover is held in an upright position. A portion of the handle may be removable to provide compact shipment of the power washer.

The rear legs may be pivotally attached to the front legs, so that folding of the front legs causes a corresponding folding of the rear legs. The rear or the front legs may additionally be slidingly attached to the frame. In this manner, the sliding attachment of the legs to the frame may be used to limit movement of the handle and the front and rear legs, for example to lock or hold the legs in the operating position, and to lock or hold the handle in the stored position (i.e., prevent rotation of the prime mover and frame relative thereto). The front legs and/or the rear legs may include wheels. This feature permits the power washer to be wheeled to a convenient location.

The prime mover for the power washer is preferably a gas engine. If a gas engine is used, hanging the power washer in an upright position prevents oil and gas in the engine from leaking or improperly settling.

In accordance with another aspect of the present invention, a locking device, such as a spring-biased pin or the like, may be provided for locking the legs into the operating and/or storage positions. The locking pin prevents the legs from accidentally being folded as the power washer is wheeled to a location, and prevents the power washer from folding out when in the storage position.

Other advantages will become apparent from the following detailed description when taken in conjunction with the drawings, in which:

BRIEF DESCRIPTION OF THE DRAWINGS

FIG. 3 is a side view of the power washer as shown in FIG. 2;

FIG. 4 is a side view of the power washer of FIG. 1, similar to FIG. 3, and showing the power washer in a beginning stage of unfolding;

FIG. 5 is a side view of the power washer of FIG. 1, similar to FIG. 4, showing the power washer in a further stage of unfolding;

FIG. 6 is a side view of the power washer of FIG. 1, similar to FIG. 5, showing the power washer fully unfolded such as in FIG. 1;

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details. Furthermore, well-known features may be omitted or simplified in order not to obscure the present invention.

Figure 1:
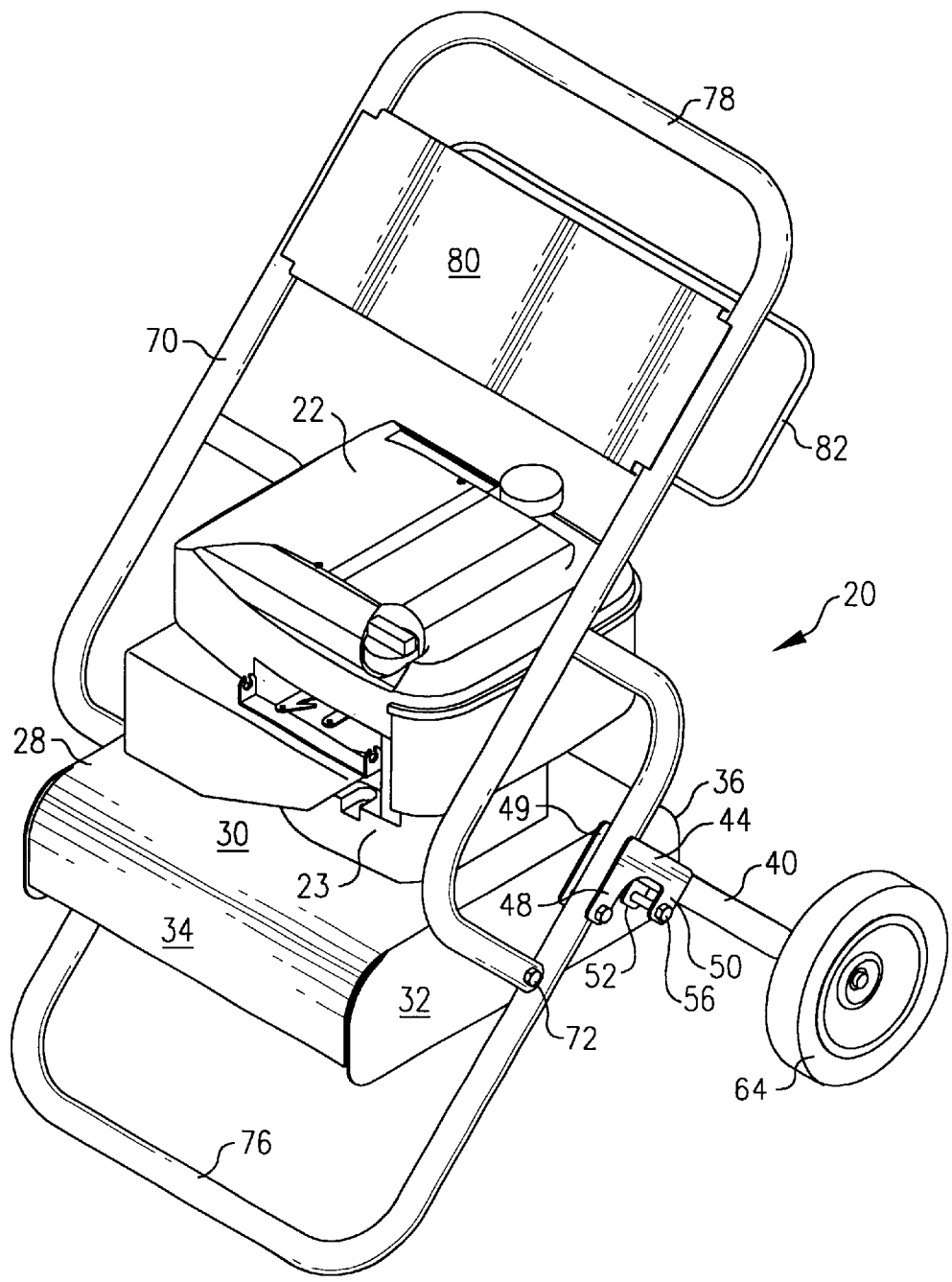
FIG. 1 is an isometric view of a power washer made in accordance with the present invention, with the power washer shown folded out to an operating configuration.
Figure 2:
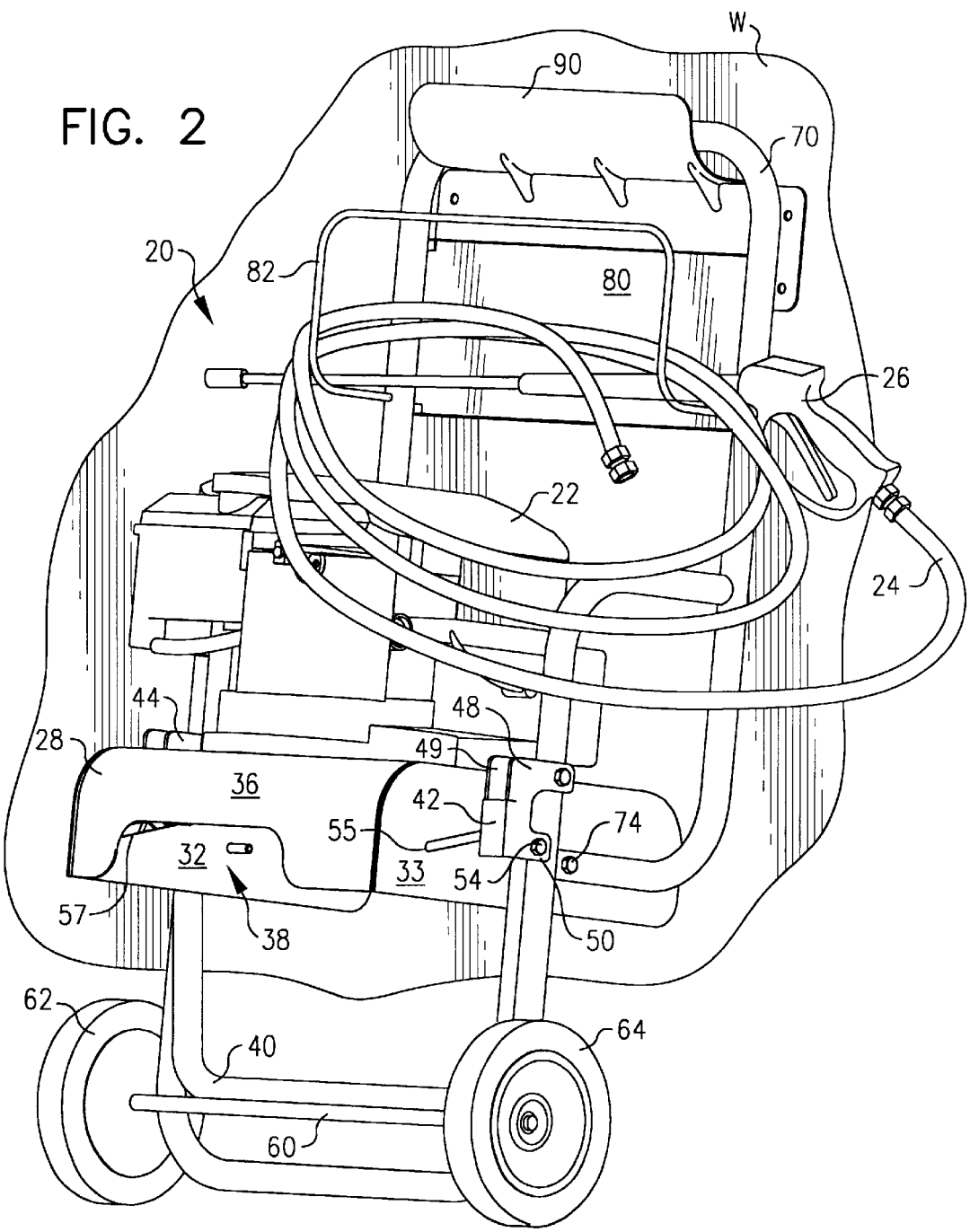
FIG. 2 is an isometric view of the power washer of FIG. 1, with the power washer folded to a storage configuration.

Briefly described, with reference to FIG. 1, the present invention provides a portable power washer 20. As can be seen in FIGS. 1 and 2, the power washer 20 is reconfigurable by folding from a configuration (FIG. 1) where it rests on a pedestal (e.g., legs) and may be pushed or pulled by a handle and rolled on wheels, to a compact configuration where it may be conveniently hung on a wall or other hanging surface (FIG. 2).

The power washer 20 includes a prime mover 22. The prime mover 22 is mounted over a pump 23, such as is known in the art. In the embodiment shown in the drawing, the prime mover 22 is a gas engine, but other prime movers may be used, such as an electric motor. The pump 23 includes a connection (not shown, but known in the art) for attaching to a water source, such as a water hose connected to a hose bib (also not shown). A high-pressure hose 24 (FIG. 2 only) is removably attachable to the pump 23, and includes a wand 26 (also FIG. 2) at a distal end.

The prime mover 22 is mounted over the pump 23, which in turn is mounted on a frame 28. The frame 28 shown in the drawings includes a top 30, and flat right and left side panels 32, 33 that extend downward from the top. Front and rear panels 34, 36 also extend downward from the top 30. The front and rear panels 34, 36 may be rounded downward and formed integral with the top 30, such as is shown in the drawings. The rear panel 36 includes a cutout 38, behind which may be mounted attachments (not shown, but known in the art) for hoses or the like. Alternatively, the rear panel 36 may be otherwise shaped or arranged to permit access to the attachments. The frame 28 may be formed of any suitable material, such as steel, aluminum, or plastic. Although the frame 28 shown includes panels, the prime mover 22 may be mounted on different frames, such as on metal tubing or the like.

The power washer 20 includes a rear leg frame 40 made, for example, of tubular steel or aluminum. The rear leg frame 40 in the drawings is U-shaped, and is attached at its ends to a pair of leg brackets 42, 44. A bottom end of each of the leg brackets 42, 44 extends around the top of the rear leg frame 40. The leg brackets 42, 44 each include a pair of L-shaped brackets 48 arranged on opposite sides of the rear leg frame 40, so that one leg of the "L" extends parallel to the rear leg frame, and the other leg extends toward the front of the power washer. Flanges 50, 52 also extend forward from the bottom of the leg brackets 42, 44.

In the embodiment shown in FIGS. 1–6, a pin 54 (e.g., a bolt or other suitable fastener) extends through the two flanges 50, 52, and extends into a slot 55 (FIG. 2) on the left side panel 33. A similar pin 56 extends through the two flanges 50, 52 on the opposite leg mount and extends into a slot 57 (partly shown through the frame 28 in FIG. 2) on the right side panel 32. The pins 54, 56 are attached so that they may slide along the slots 55, 57, the function of which is described below.

An axle 60 (FIG. 2) is attached to the bottom of the rear leg frame 40. Two wheels 62, 64 are rotatably mounted on opposite ends of the axle 60.

The power washer 20 includes a front leg frame 70 made, for example, of tubular steel or aluminum. The front leg frame 70 is pivotally attached to the left and right panels 32, 33 of the frame 28 by a pair of pins 72, 74 (e.g., bolts or other suitable fasteners). The front leg frame 70 includes a lower, U-shaped support 76 (best shown in FIG. 1) and an upper, U-shaped handle portion 78. Each of the U-shaped pieces 76, 78 terminates in a 90-degree angle, and the ends of the 90-degree angle are attached to the opposite U-shaped piece. Thus, as shown in FIG. 3, a side view of both the U-shaped handle portion 78 and the U-shaped support 76 is an "L," with the "L" for the U-shaped support 76 being upside down, and the two "L's" connected face to face at their bottom portions. In this manner, the U-shaped handle portion 78 is offset from the U-shaped support 76. The front leg frame 70 is pivotally connected by pins 79 to the distal ends of the L-shaped brackets 48 on the leg brackets 42, 44.

A panel 80 extends across the front of the U-shaped handle portion 78. A hose hook 82 extends on the opposite side of the handle. The high-pressure hose 24 and the wand 26 may be hung on the hose hook 82, as is shown in FIG. 2.

As can be seen in FIG. 1, in an operating position, the power washer 20 rests on the wheels 62, 64 and the U-shaped support 76 of the front leg frame 70. In this position, the upper part of each side of the U-shaped support 76 is supported between the two L-shaped brackets 48 on the leg brackets 42, 44. The power washer 20 may be pushed around by the U-shaped handle portion 78 of the front leg frame 70 while tilted back on the wheels 62, 64.

To reconfigure the power washer 20 into the collapsed position shown in FIG. 2, the front leg frame 70 is rotated relative to the frame. During this rotation, the front leg frame 70 is removed from the L-shaped brackets 48, 49 and the rear leg frame 40 pivots relative to the front leg frame 70 about the pins 79. The movement of the front leg frame 70 forward pulls the rear leg frame 40 along, causing the pins 54 to slide along the slots 55, and the rear leg frame 40 to rotate relative to the front leg frame 70. This movement continues until the pins 54 reach the ends of the slots 55, where further movement is prevented. At this point, the front leg frame 70, including the handle portion 78, is at a 90-degree angle to the frame 28.

With the frame 28 at a 90-degree angle to the front leg frame 70, the upper end of the U-shaped handle portion 78 may be hung, for example on a hanger 90 (FIG. 2). The hanger 90 shown is elongate, and therefore provides a sturdy support for the power washer. The hanger 90 may be mounted on a wall W or other vertical surface, or a similar hanger may be mounted to a ceiling or other location above the floor. However, by mounting the hanger 90 on a wall, the U-shaped handle portion 78 of the front leg frame 70 leans against the wall, providing further support for the power washer.

Because the frame 28 is at a 90 angle to the front leg frame 70, and the front leg frame extends vertically when hung, the prime mover 22 is maintained in an upright, horizontal position when the power washer 20 is stored. This feature is available because of the offset nature of the front leg frame 70, but may also be provided by any structure that permits the power washer 20 to be hung on a wall and at the same time contacts the wall at another location so that the prime mover 22 is supported horizontally. In this manner, oil and gas in the prime mover 22 do not leak or flow to the wrong places in the engine.

The present invention provides a unique way of storing a power washer when not in use. The power washer 20, when removed from the hanger 90, may be unfolded and placed on the U-shaped support 76 of the front leg frame 70 and the rear leg frame 40. If desired, wheels may also be provided at the lower end of the U-shaped support 76 so that the power washer 20 may more easily be rolled to a location.

Although both the front leg frame 70 and the rear leg frame 40 pivot relative to the frame 28 of the power washer 20, the rear leg frame 40 may be fixed relative to the frame 28. However, by allowing the rear leg frame 40 to pivot, the wheels 62, 64 and the rear leg frame 40 are moved under the frame 28 when the power washer is folded to the stored position, and the power washer 20 may thereby be more efficiently stored. The rear leg frame 40 may also not be attached to the frame 28, and may only be pivotally attached to the front leg frame 70. However, the slots 55 and the pins 54, 56 provide a mechanism that limits forward and backward rotation of the front and rear leg frames 70, 40, and therefore the handle, relative to the frame 28. If the rear leg frame 40 is not attached to the frame, some other mechanism other than the slots 55 and pins 54, such as a stop, may be provided to prevent the frame 28 from rotating when the power washer 20 is hung or when the power washer 20 is in the operating position.

One or two locks may be provided to lock the power washer in the stored or operating positions. However, in the embodiment shown, the weight of the power washer 20 and the engagement of the pins 54, 56 in the ends of the slots 55, maintain the power washer in these two positions.

The offset configuration of the front leg frame 70 permits the frame 28 and the prime mover 22 to be supported at near their center, providing balance the stored power washer 20, and allowing the front leg frame to extend vertically during storage. If desired, however, the front leg frame 70 may be configured differently, such as in a straight or curved configuration. In addition, if desired, the front legs may be fixed relative to the frame, and only the handle may rotate to move to the stored position. Again, however, by having the front legs rotate, the legs are moved under the frame 28 and the prime mover 22, providing more efficient storage.

The hose hook 82 is conveniently located so that the high-pressure hose 24 and the wand 26 may remain on the hose hook during storage. The high-pressure hose 24 and the wand 26 also do not have to be removed to reconfigure the power washer 20 between the stored and operating positions. This feature permits the power washer to be reconfigured without much effort and in a short amount of time. Having the rear leg frame 40 pivotally attached to the front leg frame 70 is also convenient, because it permits the power washer 20 to be reconfigured in one movement of the front leg frame 70, for example by pushing on the handle portion 78 of the front leg frame.

The 90-degree turn in the U-shaped support 76 not only provides offset for the front leg frame 70, but also presents a pair of handles when the power washer is in the stored position. These handles may be used to lift the power washer 20 to hang it on the hanger 90, or to lift the power washer off the hanger. The power washer may also be lifted by the sides of the handle, the frame, or in other suitable locations.

If desired, the components of the power washer 20 may be constructed of composites, plastics, or other light materials. These materials may make the power washer 20 easier to lift and reconfigure.

Figure 7:
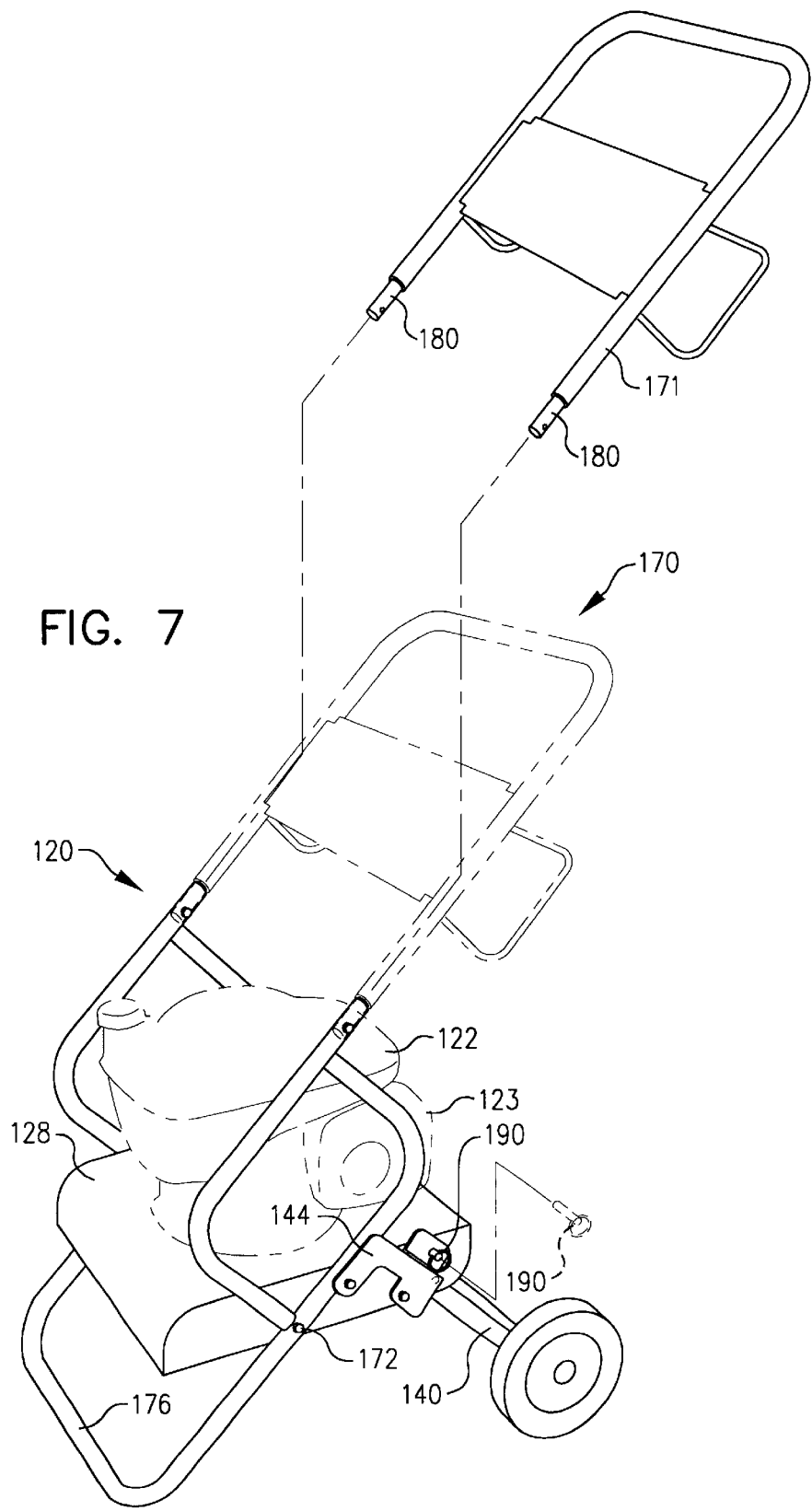
FIG. 7 is an isometric view of a second embodiment of a power washer incorporating the present invention, with a portion of the handle removed.
Figure 9:
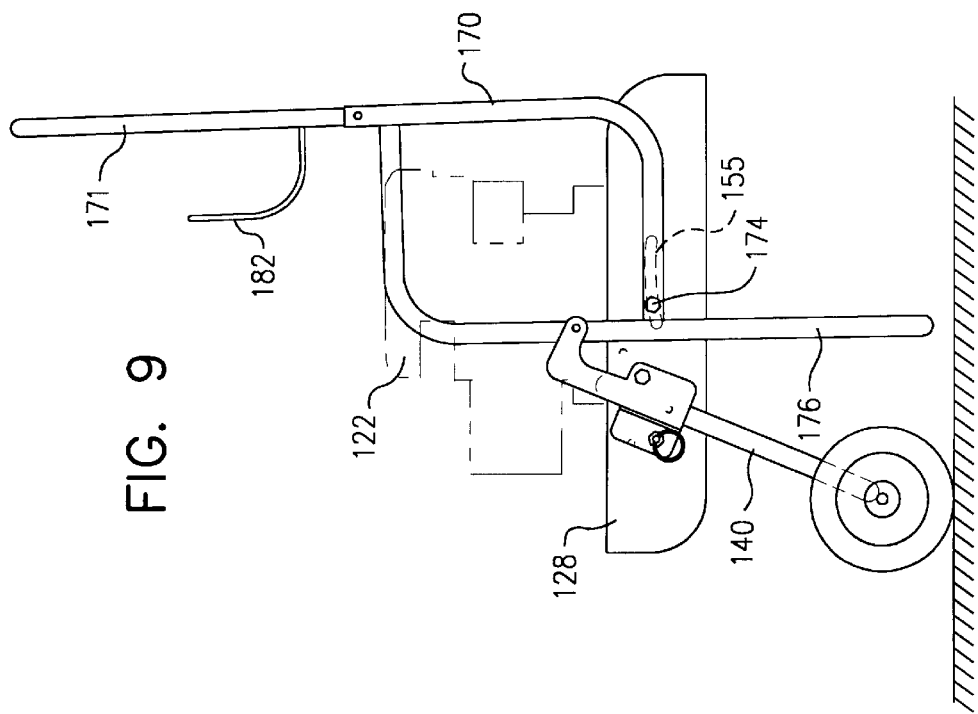
FIG. 9 is a side view of the power washer of FIG. 7, similar to FIG. 8, but with the power washer folded into a storage position.
Figure 8:
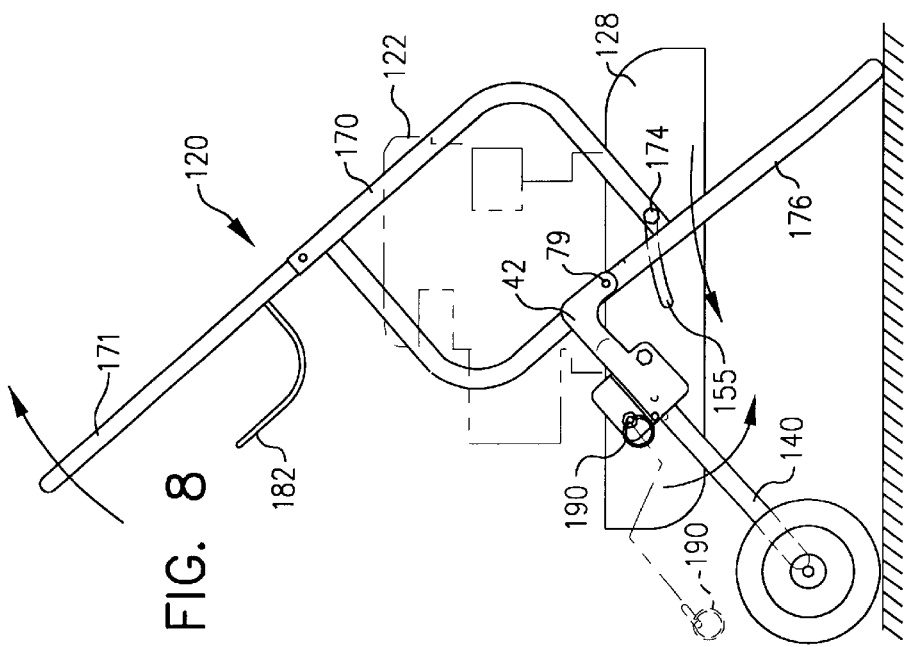
FIG. 8 is a side view of the power washer of FIG. 7, with the power washer shown in a folded-out, operating position.

An alternate embodiment of a power washer 120 incorporating the present invention is shown in FIGS. 7–9. The general configuration of the power washer 120 is similar to the configuration of the power washer 20, in that the power washer 120 includes an integral front leg 176 and handle 170 rotatably attached to a frame 128, and a rear leg assembly 140 that is also rotatably attached to the frame. However, unlike the power washer 20, in which the rear leg assembly 40 is slidingly mounted to the frame 28, in the power washer 120, the front leg assembly 176 is slidingly mounted to the frame 128 via pins 172 in slots 155. This configuration permits the power washer 120 to be more compactly folded than the power washer 20, because the offset portion of the handle 170 is moved into the center of the frame 128, as can be seen in FIG. 9. The folding of the two legs works in much the same manner, but is the mirror image of the folding process for the power washer 20.

The power washer 120 includes other features. The prime mover 122 has been rotated 90 degrees to make it easier to service the engine and fill it with fuel. The handle 170 includes a grip portion 171 that is removable from the rest of the handle. The grip portion 171 may include, for example, cylindrical projections 180 that fit within cylindrical slots on the handle 170. Other mechanisms may be used for attachment of the grip portion 171. By removing the grip portion 172, the power washer may be more compactly shipped, allowing a smaller shipping carton and thus less expense in shipping. After shipped, the grip portion 172 is attached to the remainder of the handle 170, for example via the cylindrical projections 180 described above, and may be secured in place by screws or other suitable fasteners.

The power washer 120 also includes a locking mechanism, in the form of a locking pin 190, for locking the front and rear legs of the power washer into position. The locking pin 190 may be, for example, a spring loaded pin that is aligned to fit in one of two holes on the sides of the frame 128. One of the holes may lock the legs in the storage position, and the other may lock it in the operating position. The locking pin 190 works as a safety device to ensure that the unit is locked into position either when it is being used or stored. It is particularly handy when the power washer is being wheeled around, because it assures that the legs do not fold, which would be inconvenient.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

What is claimed is:

1. A power washer comprising:
    a frame;
    a prime mover mounted an the frame;
    a pedestal attached to the frame for supporting the frame and the prime mover, the pedestal comprising a front leg assembly;
    at least one wheel on the pedestal; and
    a handle fixed for rotation with the front leg assembly and having a first stop associated therewith, and rotatably mounted relative to the frame, and reconfigurable between a first position in which the handle is at a first angle to the frame, and a user may grasp the handle and roll the power washer on the at least one wheel, and a second position in which the handle is at a second angle to the frame and prevented from further rotation by the first stop, and the power washer is hung by the handle and the prime mover is supported substantially horizontally, the handle being offset relative to the front leg assembly, wherein the front leg assembly is positioned under the frame and the handle extends adjacent to one side of the frame when the power washer is in the second position.

2. The power washer of claim 1, wherein the prime mover is an internal combustion engine.

3. The power washer of claim 1, wherein the pedestal comprises a rear leg assembly.

4. The power washer of claim 3, wherein the front leg assembly is rotatably mounted relative to the frame.

5. The power washer of claim 1, wherein the handle comprises a removable portion.

6. A power washer comprising:
a frame;
a prime mover mounted on the frame;
a pedestal attached to the frame for supporting the frame and the prime mover, the pedestal comprising:
a front leg assembly rotatably mounted relative to the frame; and
a rear leg assembly is rotatably attached to the front leg assembly;
at least one wheel on the pedestal; and
a handle having a first stop associated therewith, and rotatably mounted relative to the frame, and reconfigurable between a first position in which the handle is at a first angle to the frame, and a user may grasp the handle and roll the power washer on the at least one wheel, and a second position in which the handle is at a second angle to the frame and prevented from further rotation by the first stop, and the power washer is hung by the handle and the prime mover is supported substantially horizontally.

7. The power washer of claim 6, wherein one of the rear leg assembly and the front leg assembly is slidingly mounted to the frame.

8. The power washer of claim 7, wherein the at least one wheel is attached to the rear leg assembly.

9. The power washer of claim 8, wherein there are two wheels attached to the rear leg assembly.

10. The power washer of claim 7, wherein the front leg assembly is fixed to rotate with the handle.

11. The power washer of claim 10, wherein the handle is offset relative to the front leg assembly, wherein the front leg assembly is positioned under the frame and the handle extends adjacent to one side of the frame when the power washer is in the second position.

12. The power washer of claim 10, wherein sliding movement of the one of the front leg assembly and rear leg assembly is limited in one direction, serving as the first stop for rotation of the handle.

13. The power washer of claim 12, wherein sliding movement of the one of the front leg assembly and rear leg assembly is limited in a second direction, serving as a second stop for rotation of the handle at the first position.

14. A power washer comprising:
a frame;
a prime mover mounted on the frame;
a pedestal attached to the frame for supporting the frame and the prime mover, the pedestal comprising:
a front leg assembly rotatably mounted relative to the frame; and
a rear leg assembly;
at least one wheel on the pedestal; and
a handle fixed to rotate with the front wheel assembly and having first stop associated therewith, and rotatably mounted relative to the frame, and reconfigurable between a first position in which the handle is at a first angle to the frame, and a user may grasp the handle and roll the power washer on the at least one wheel, and a second position in which the handle is at a second angle to the frame and prevented from further rotation by the first stop, and the power washer is hung by the handle and the prime mover is supported substantially horizontally.

15. The power washer of claim 14, wherein the handle is offset relative to the front leg assembly, wherein the front leg assembly is positioned under the frame and the handle extends adjacent to one side of the frame when the power washer is in the second position.

16. A power washer comprising:
a frame;
a prime mover mounted on the frame;
a pedestal attached to the frame for supporting the frame and the prime mover, the pedestal comprising:
a front leg assembly; and
a rear leg assembly rotatably attached to the front leg assembly;
at least one wheel on the pedestal; and
a handle having a first stop associated therewith, and rotatably mounted relative to the frame, and reconfigurable between a first position in which the handle is at a first angle to the frame, and a user may grasp the handle and roll the power washer on the at least one wheel, and a second position in which the handle is at a second angle to the frame and prevented from further rotation by the first stop, and the power washer is hung by the handle and the prime mover is supported substantially horizontally.

17. The power washer of claim 16, wherein one of the front leg assembly and the rear leg assembly is slidingly mounted to the frame.

18. A power washer comprising:
a frame;
a prime mover mounted on the frame;
a pedestal attached to the frame for supporting the frame and the prime mover, the pedestal comprising:
a front leg assembly rotatably mounted relative to the frame; and
a rear leg assembly;
at least one wheel on the pedestal;
a handle having a first stop associated therewith, and rotatably mounted relative to the frame, and reconfigurable between a first position in which the handle is at a first angle to the frame, and a user may grasp the handle and roll the power washer on the at least one wheel, and a second position in which the handle is at a second angle to the frame and prevented from further rotation by the first stop, and the power washer is hung by the handle and the prime mover is supported substantially horizontally; and
a locking mechanism for locking movement of the front leg assembly and the rear leg assembly when the handle is in at least one of the first position and second positions.

19. A power washer comprising:
a frame;
a prime mover mounted on the frame;
a handle attached to the frame;
a front leg assembly rotatably attached to the frame; and
a rear leg assembly rotatably attached to the front leg assembly, wherein the rear leg assembly and the front leg assembly are reconfigurable between a first position in which the rear leg assembly and the front leg assembly are separated such that they may support the power washer, and a second position in which the front leg assembly and the rear leg assembly are closer to one another than in the first position.

20. The power washer of claim 19, wherein one of the front leg and the rear leg assembly is slidingly mounted to the frame.

21. The power washer of claim 20, wherein sliding movement of the one of at least one the front leg and the rear leg assembly relative to the frame is limited in one direction, serving as a first stop for preventing rotation of the front leg assembly and the rear leg assembly beyond the first position.

22. The power washer of claim 21, wherein sliding movement of the rear leg assembly is limited in a second direction, serving as a second stop for rotation of the front leg assembly and the rear leg assembly beyond the second position.

23. The power washer of claim 20, wherein at least one wheel is attached to the rear leg assembly.

24. The power washer of claim 23, wherein there are two wheels attached to the rear leg assembly.

25. The power washer of claim 19, wherein the handle is mounted for rotation relative to the frame.

26. The power washer of claim 25, wherein the front leg assembly is fixed to rotate with the handle.

27. The power washer of claim 26, wherein the handle is offset relative to the front leg assembly, wherein the front leg assembly is positioned under the frame and the handle extends adjacent to one side of the frame when the rear leg assembly and front leg assembly are in the second position.

28. A power washer comprising:

a frame;

a prime mover mounted on the frame;

a handle rotatably attached to the frame;

a front leg assembly rotatably attached to the frame;

at least one wheel attached to the rear leg assembly; and a rear leg assembly rotatably attached to at least one of the front leg assembly and the frame, wherein the rear leg assembly, the handle, and the front leg assembly are reconfigurable between a first position in which the rear leg assembly and the front leg assembly are separated such that they may support the power washer and a user may grasp the handle and roll the power washer on the at least one wheel, and a second position in which the front leg assembly and the rear leg assembly are closer together than in the first position and the power washer may be hung by the handle and the prime mover is supported substantially horizontally.

29. The power washer of claim 28, wherein one of the front leg assembly and the rear leg assembly is slidingly mounted to the frame, and is rotatably mounted to the other of the front leg assembly and the rear leg assembly.

30. The power washer of claim 29, wherein sliding movement of the one of the front leg assembly and the rear leg assembly is limited in one direction, serving as a first stop for rotation of the handle beyond the first position.

31. The power washer of claim 29, wherein sliding movement of the one of the front leg assembly and the rear leg assembly is limited in a second direction, serving as a second stop for rotation of the handle beyond the second position.

32. The power washer of claim 28, wherein there are two wheels attached to the rear leg assembly.

33. The power washer of claim 28, wherein the front leg assembly is fixed to rotate with the handle.

34. The power washer of claim 33, wherein the handle is offset relative to the front leg assembly, wherein the front leg assembly is positioned under the frame and the handle extends adjacent to one side of the frame when the power washer is in the second position.

35. The power washer of claim 28, further comprising a locking mechanism for locking movement of the front leg assembly and the rear leg assembly when in at least one of the first second positions.

* * * * *